United States Patent
Chan et al.

(10) Patent No.: US 9,442,705 B2
(45) Date of Patent: Sep. 13, 2016

(54) SHARING AUTHENTICATION PROFILES BETWEEN A GROUP OF USER DEVICES

(71) Applicant: NEXTBIT SYSTEMS INC., San Francisco, CA (US)

(72) Inventors: Michael A. Chan, San Francisco, CA (US); Justin Quan, San Francisco, CA (US); Daniel R. Bornstein, San Francisco, CA (US); Tom Moss, Los Altos, CA (US); Linda Tong, San Francisco, CA (US)

(*) Notice: Subject to any disclaimer, the term of this patent is extended or adjusted under 35 U.S.C. 154(b) by 15 days.

(21) Appl. No.: 14/221,189

(22) Filed: Mar. 20, 2014

(65) Prior Publication Data

US 2014/0289824 A1 Sep. 25, 2014

Related U.S. Application Data

(60) Provisional application No. 61/804,134, filed on Mar. 21, 2013.

(51) Int. Cl.
  G06F 21/31  (2013.01)
  G06F 9/54  (2006.01)
  (Continued)

(52) U.S. Cl.
  CPC . *G06F 8/44* (2013.01); *G06F 9/54* (2013.01); *G06F 11/1464* (2013.01); *G06F 17/3053* (2013.01); *G06F 17/30174* (2013.01); *G06F 17/30194* (2013.01); *G06F 17/30575* (2013.01); *H04L 41/0816* (2013.01); *H04L 47/70* (2013.01); *H04L 47/78* (2013.01); *H04L 63/0853* (2013.01); *H04L 67/10* (2013.01);
  (Continued)

(58) Field of Classification Search
  CPC ......... G06F 8/44; G06F 21/31; H04L 63/08; H04L 63/083
  See application file for complete search history.

(56) References Cited

U.S. PATENT DOCUMENTS 7,813,730 B2  10/2010  Patel et al.
8,365,249 B1   1/2013  Cope et al.
(Continued)

FOREIGN PATENT DOCUMENTS

WO   2009044174 A2   4/2009
WO   2012057661 A1   5/2012

OTHER PUBLICATIONS

International search report for PCT Application No. PCT/US2014/031489 mailed on Sep. 18, 2014.
(Continued)

*Primary Examiner* — Jason K. Gee
*Assistant Examiner* — Thanh T Le

(57) ABSTRACT

Technology is disclosed for sharing an authentication profile of a user between a group of user devices for accessing an access restricted computing environment ("the technology"). The access restricted computing environment can require the user to input authentication information, such as a username, password, or answers to challenge questions, to authenticate the user. For example, to access a wireless network on a first user device, a user may have to input a password for the wireless network. To access the same wireless network on a second user device, the user may have to input the password again on the second user device. The technology facilitates the user to obtain the authentication information required to access the wireless network from another user device, e.g., a device from which the user has accessed the wireless network previously. This can eliminate the need for the user to manually input the authentication information repeatedly.

33 Claims, 11 Drawing Sheets

(51) Int. Cl.

| | | |
|---|---|---|
| *G06F 9/45* | (2006.01) | |
| *G06F 17/30* | (2006.01) | |
| *H04L 29/08* | (2006.01) | |
| *G06F 11/14* | (2006.01) | |
| *H04L 12/24* | (2006.01) | |
| *H04L 12/911* | (2013.01) | |
| *H04L 29/06* | (2006.01) | |
| *H04W 12/06* | (2009.01) | |

(52) U.S. Cl.
CPC .......... *H04L 67/1095* (2013.01); *H04L 69/04* (2013.01); *H04W 12/06* (2013.01); *G06F 11/1451* (2013.01); *G06F 11/1469* (2013.01)

(56) References Cited

U.S. PATENT DOCUMENTS

| | | |
|---|---|---|
| 8,381,282 B1 | 2/2013 | Doukhvalov et al. |
| 8,438,631 B1 | 5/2013 | Taylor et al. |
| 2003/0200217 A1 | 10/2003 | Ackerman |
| 2005/0081044 A1* | 4/2005 | Giles ............... H04L 63/08 713/182 |
| 2006/0130126 A1* | 6/2006 | Touve ............. H04L 63/0815 726/5 |
| 2006/0293028 A1 | 12/2006 | Gadamsetty et al. |
| 2009/0298467 A1* | 12/2009 | Zohar ............. H04L 63/0884 455/411 |
| 2011/0033052 A1 | 2/2011 | Yamada |
| 2011/0047603 A1* | 2/2011 | Gordon ............... H04L 63/06 726/5 |
| 2012/0144468 A1 | 6/2012 | Pratt et al. |
| 2013/0046990 A1 | 2/2013 | Fahrny et al. |
| 2013/0090980 A1 | 4/2013 | Hummel |
| 2013/0115915 A1* | 5/2013 | Tipton ............... H04W 12/08 455/411 |
| 2013/0288648 A1* | 10/2013 | Light ................. G06F 9/468 455/411 |
| 2014/0033288 A1 | 1/2014 | Wynn et al. |
| 2014/0068058 A1 | 3/2014 | Wolf |
| 2014/0165165 A1* | 6/2014 | Story, Jr. ........... H04W 12/04 726/6 |
| 2014/0208112 A1* | 7/2014 | McDonald ......... H04W 12/04 713/171 |

OTHER PUBLICATIONS

Non-Final Office Action mailed Jun. 12, 2014, for U.S. Appl. No. 14/252,720 of Chan, M.A., et al., filed Apr. 14, 2014.

Notice of Allowance mailed Aug. 7, 2014, for U.S. Appl. No. 14/252,720 of Chan, M.A., et al., filed Apr. 14, 2014.

* cited by examiner

250

Authentication Profile

Computing Environment ID:

Username:

Password/Passcode:

Challenge Question 1:

Answer to Q1:

Challenge Question 2:

Answer to Q2:

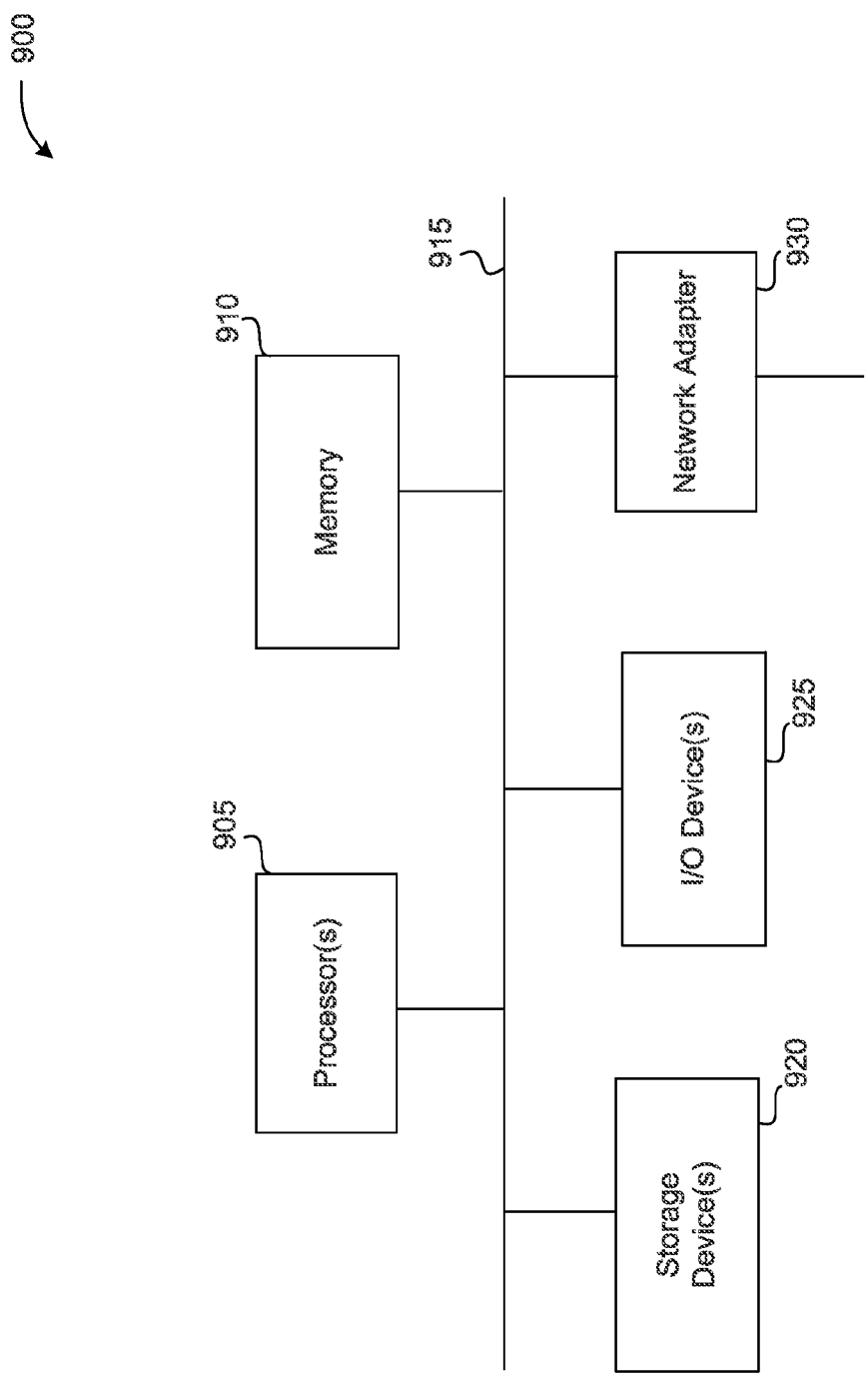

SHARING AUTHENTICATION PROFILES BETWEEN A GROUP OF USER DEVICES

CROSS-REFERENCE TO RELATED APPLICATION(S)

This application claims the benefit of U.S. Provisional Patent Application No. 61/804,134, entitled "OPERATING SYSTEM AND DEVICE INTEGRATED WITH CLOUD COMPUTING FUNCTIONALITIES", filed on Mar. 21, 2013, which is incorporated by reference herein in its entirety.

TECHNICAL FIELD

Several of the disclosed embodiments relate to authentication of users, and more particularly, to sharing authentication profiles of the user between a group of user devices.

BACKGROUND

Portable devices such as mobile phones, smartphones, and tablet computers have become more common among individuals. The portable devices provide a convenient way to access various content, e.g., on Internet, via a wireless network. Typically, to access an access restricted computing environment, e.g., a server, an application executing on a server, or a communication network such as a wireless network, the user may have to input credential information, such as a username, a password, or answers to challenge questions, to gain access to the access restricted computing environment. For example, to gain access to a wireless network on a user device, a user may have to enter a password for authentication by the wireless network. If the user wants to access the same wireless network on another user device, the user may have to input the password again for authentication on the other user device. This can be burdensome for the user.

In another example, a banking website can have multiple authentication levels. For example, if the user is accessing the banking website for first time on a particular user device, in a first level of authentication, the banking website can require the user to provide a first set of credential information for the banking website to trust the user device. Then, upon successfully authentication of the first set of credential information, the banking website can require a second set of credential information, e.g., a username and password, to provide access to the user's bank account. If a user accesses the banking website from another user device, the user may have to input all the credential information again. While secure, inputting multiple sets of credential information every time a user requires access to an application can be burdensome for the user. Also, as the number of access restricted applications increase, the number of sets of credential information can increase, and remembering all the credential information can be an added burden.

BRIEF DESCRIPTION OF THE DRAWINGS

FIG. 2B is an example of an authentication profile that can be generated in the environment of FIG. 1.

FIG. 9 is a block diagram of a computer system as may be used to implement features of some embodiments of the disclosed technology.

DETAILED DESCRIPTION

Figure 1:
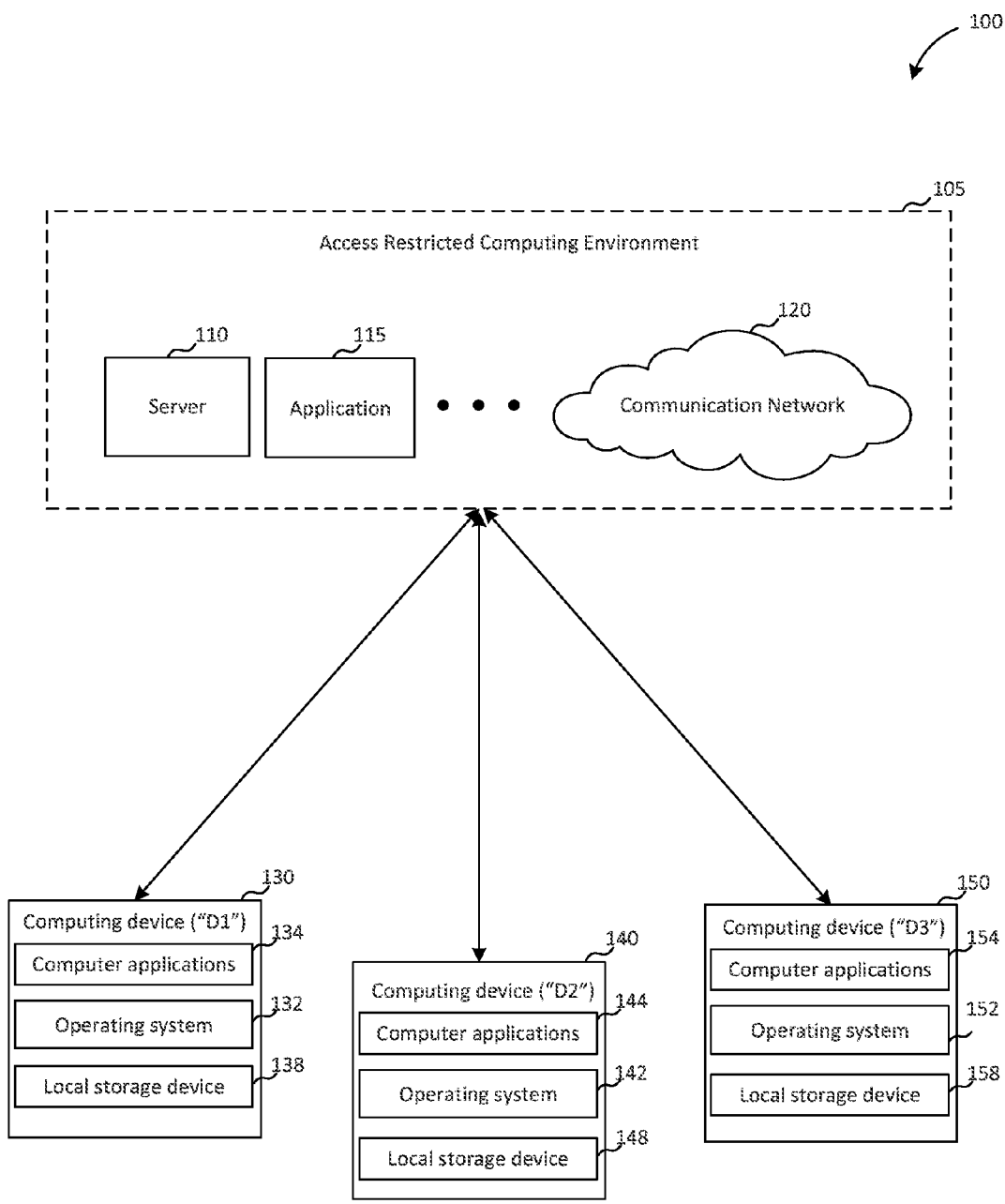
FIG. 1 is a block diagram illustrating an environment in which sharing of authentication profile between computing devices of a group for accessing an access restricted computing environment can be implemented.

Technology is disclosed for sharing an authentication profile of a user between user devices of a group for accessing an access restricted computing environment using any of the user devices ("the technology"). In some embodiments, the technology allows the user to obtain authentication information required to gain access to the access restricted computing environment from another user device, e.g., a user device from which the user has accessed the access restricted computing environment previously. In some embodiments, an access restricted computing environment can include a server, an application executing on the server, or a communication network such as a wireless network. The access restricted computing environment can require the user to input credential information (or authentication information), such as a username, a password, or answers to challenge questions, to authenticate the user. For example, to gain access to a wireless network on a first user device, a user may have to enter a password for authentication by the wireless network. If the user wants to access the same wireless network on a second user device, the user may have to input the password again on the second user device. The technology allows the user to obtain the authentication information required to gain access to the wireless network from another user device, e.g., a device such as the first device from which the user has accessed the wireless network previously. This eliminates the need for the user to input the authentication information again on the second user device.

In some embodiments, when the second user device requests the first user device to share the authentication profile with the second user device, the first user device determines if the second user device is also a member of the trusted devices group of which the first user device is a member. If the second user device is also a member of the trusted devices group of which the first user device is a member, the first user device transmits the authentication profile to the second user device. The second user device receives the authentication profile, extracts the authentication information from the authentication profile, and provides the authentication information to the wireless network to gain access. In some embodiments, the authentication profile can be transmitted in an encrypted form.

In some embodiments, the first user device shares the authentication profile with the second user device based on a location of the devices, e.g., if the devices are in proximity. The first user device can share the authentication profile if the first user device is in proximity to the second user device. In some embodiments, the user devices are considered to be in proximity if they can communicate with each other using direct communication techniques such as Bluetooth, Infrared, near field communications (NFC), AirDrop, Wi-Fi direct, Wi-Fi, Digital Living Network Alliance (DLNA), etc.

The authentication profile can contain authentication information such as a username, user identification (ID), a password, a passcode or answers to challenge questions. The authentication profile can also include ID of the access restricted computing environment, e.g., service set identification (SSID) of the wireless network. In some embodiments, the authentication profile is generated when the user accesses a wireless network for the first time. The user device on which the user accesses the wireless network for the first time can generate the authentication profile for the user for the wireless network upon successful authentication of the user on the user device. The user device can be a computing device, e.g., mobile computing devices such as a tablet, a laptop, or a smartphone, or a desktop.

An access restricted computing environment, e.g., a banking website, can have multiple authentication levels which require the user to provide one or more sets of authentication information. The authentication profile can be configured to store authentication information of one or more of the authentication levels. In some embodiments, the authentication profile is configured to store the authentication information required for all authentication levels. In some embodiments, the authentication profile is configured to store the authentication information required for one or more authentication levels. For example, for a banking website which includes multiple levels of authentication, e.g., one level of authentication for trusting or identifying a particular device of the user and another level of authentication for authenticating the user, the authentication profile can be configured to store credential information for identifying the user device. The user may then input the remaining credential information for gaining access to the bank account of the user. Conversely, the authentication profile can be configured to store the entire authentication information required to access the bank account.

Environment

FIG. 1 is a block diagram illustrating an environment in which sharing of authentication profile between computing devices of a group can be implemented. The environment 100 includes an access restricted computing environment 105 (also referred to as "computing environment 105") which can be accessed by users who are authenticated by the computing environment 105. The computing environment 105 can be one or more of a server 110 that provides a particular service, an application 115 that is executing on the server 110 or any other computer systems, or a communication network 120 such as a wireless network. A user can access the computing environment 105 using one or more computing devices such as computing devices 130, 140 and 150. In some embodiments, the computing environment 105 requires the user to provide authentication information in order to provide access to the user for the computing environment 105. The user can gain access to the computing environment 105 upon successful authentication of the user by the computing environment 105. The user can provide the authentication information either manually, e.g., input using an input device, or obtain from a computing device that contains the authentication profile for the user for the computing environment 105. In some embodiments, the computing devices 130-150 can share the authentication profile between a set of computing devices.

The computing device 130-150 can be a desktop computer, a laptop computer, a tablet computer, an automobile computer, a game console, a smartphone, a personal digital assistant, home appliances, televisions, automobiles, drones, airplanes, autonomous devices such as robots, or other computing devices capable of running computer applications, as contemplated by a person having ordinary skill in the art. In some embodiments, the computing devices 130, 140 and 150 can communicate with each other via a communication network such as the communication network 120. The communication network 120 can be a local area network (LAN), a wireless LAN, wide area network (WAN) or the Internet. In some embodiments, the communication between the computing devices 130, 140 and 150 is routed through a server such as the server 110. For example, data related to computer applications 134 and 144 can be exchanged between the computing devices 130 and 140 through a server such as the server 110. In some embodiments, the computing devices 130, 140 and 150 can communicate with each other directly using a direct communication technique, e.g. Bluetooth, Infrared, NFC, AirDrop, Wi-Fi direct, Wi-Fi, or DLNA.

The computing devices 130-150 include an operating system 132-152 to manage the hardware resources of the computing devices 130-150 and provide services for running computer applications 134-154 (e.g., mobile applications running on mobile devices). The operating system 132-152 facilitates execution of the computer applications 134-154 on the computing device 130-150. The computing devices 130-150 include at least one local storage device 138-158 to store the computer applications 134-154, operating system 132-152 and user data. Some examples of the operating system 132-152 include Android, iOS, Windows, and Macintosh.

The computer applications 134-154 stored in the computing devices 130-150 can include applications for general productivity and information retrieval, including email, calendar, contacts, stock market and weather information. The computer applications 134-154 can also include applications in other categories, such as mobile games, factory automation, GPS and location-based services, banking, order-tracking, ticket purchases or any other categories as contemplated by a person having ordinary skill in the art.

Although FIG. 1 illustrates three computing devices, a person having ordinary skill in the art will readily understand that the technology disclosed herein can be applied to a single computing device or more than two computing devices connected to the server 110.

In some embodiments, when the user wants to access the computing environment 105 via a computing device, e.g., second computing device 140, the second computing device 140 determines whether any other computing devices contain the authentication profile for the computing environment 105. If the second computing device 140 determines that a first computing device 130 contains the authentication profile for the computing environment 105, the second computing device 140 requests the first computing device 130 to share the authentication profile with the second computing device 140. The second computing device can then use the authentication information from the obtained authentication profile to gain access to the computing environment 105. Additional details with respect to sharing the authentication profile between the computing devices 130-150 are described at least with reference to FIGS. 2-8.

Figure 2A:
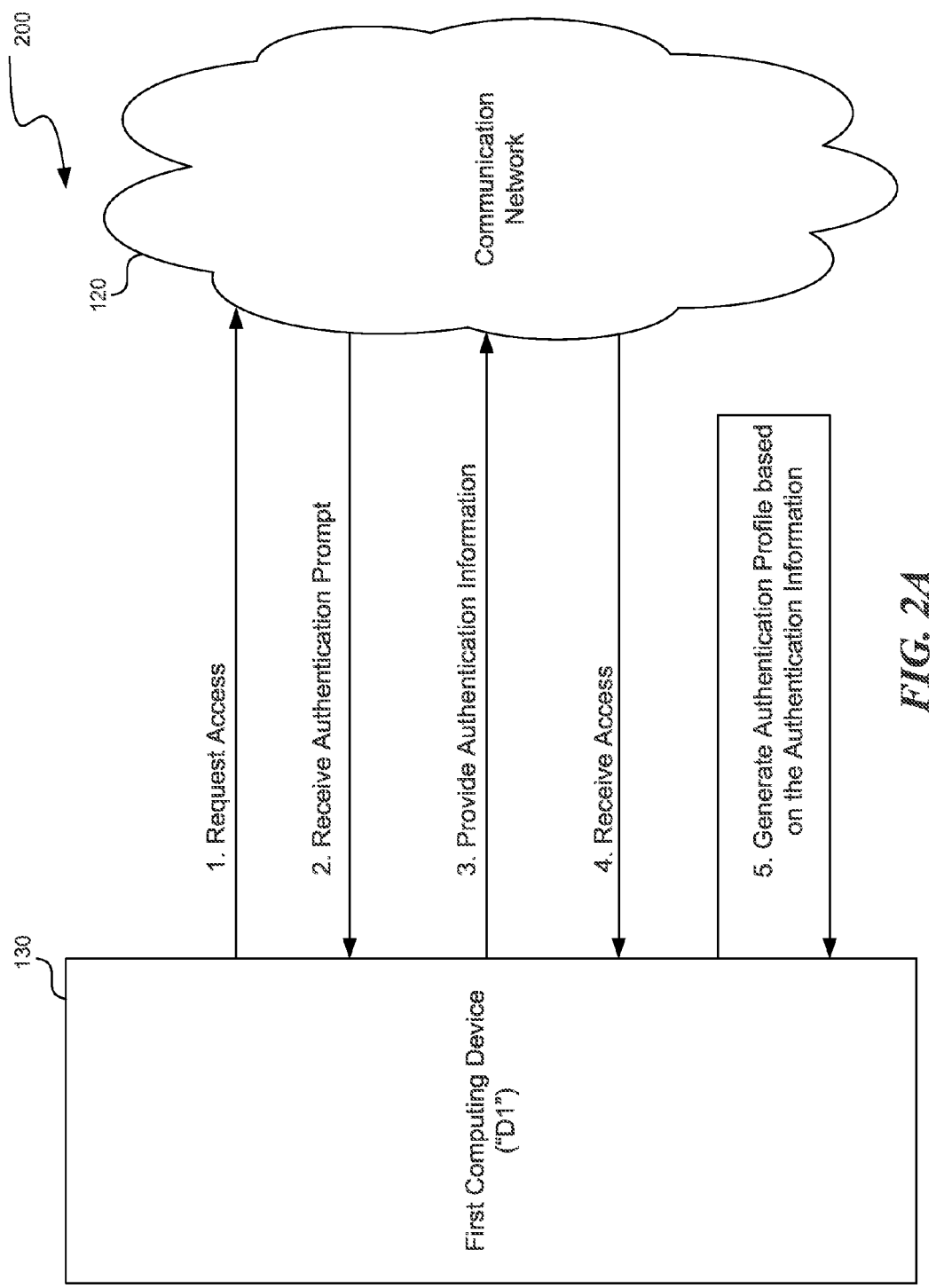
FIG. 2A is an example sequence diagram for generating an authentication profile.

FIG. 2A illustrates an example sequence diagram 200 for generating an authentication profile. In some embodiments, the generation of the authentication profile can be implemented in the environment 100 of FIG. 1. Note that the following paragraphs describe the sharing of authentication profile with reference to communication network 120. However, the sharing of authentication profile is not restricted to communication network 120. The technology can be implemented in various other access restricted computing environments 105 that can require the user to provide authentication information to gain access to the access restricted computing environment 105, as contemplated by a person having ordinary skill in the art.

At step 1, the user requests access to the communication network 120 using the first computing device 130. In some embodiments, the communication network 120 can be a password protected wireless network. Consider that the user has not accessed the communication network 120 prior to the current request on any of the computing devices 130-150. In response to the access request, at step 2, the first computing device 130 receives an authentication prompt from the communication network 120 requesting the user to provide authentication information, e.g., a password for the wireless network.

At step 3, the user provides the authentication information to the communication network 120, e.g., manually inputs the password, in response to the authentication prompt. The communication network 120 verifies the authentication information provided by the user. If the authentication fails, the user can be denied access to the communication network 120. If the authentication succeeds, at step 4, the user obtains access to the communication network 120 on the first computing device 130.

At step 5, the first computing device 130 generates an authentication profile for the communication network 120. The authentication profile can contain authentication information such as a password to the communication network 120. The authentication profile can also include ID of the communication network 120, e.g., SSID of the wireless network. In some embodiments, if the user has accessed multiple communication networks, e.g., multiple wireless networks, then an authentication profile can be created for each of the communication networks accessed by the first computing device 130.

Similarly, various authentication profiles can be created for other types of access restricted computing environment 105 accessed by the user using the first computing device 130. For example, an authentication profile for a banking website can include answers to challenge questions, e.g., authentication information for identifying a particular computing device of the user by the banking website, and username and password, e.g., to authenticate the user to provide access to the bank account information.

FIG. 2B is an example of an authentication profile 250 that can be generated in the environment 100. The authentication profile 250 can include a computing environment ID, e.g., SSID of the wireless network. The authentication profile 250 can also include different authentication information such as username or user identification (ID), a password or passcode, challenge questions or answers to challenge questions. In some embodiments, the user may choose the type of authentication information that can be stored in the authentication profile 250. That is, the user may choose to store or not store particular authentication information in the authentication profile 250. For example, for the banking website, the user may choose to store answers to challenge questions, but choose not to store username and password. In the example of communication network 120, the user can choose to store password of the wireless network. In some embodiments, the computing environment ID may be a mandatory field in the authentication profile 250. In some embodiments, the first computing device 130 can encrypt the authentication profile 250, e.g., for security purposes. Various known encryption techniques can be used to encrypt the authentication profile 250.

Figure 3:
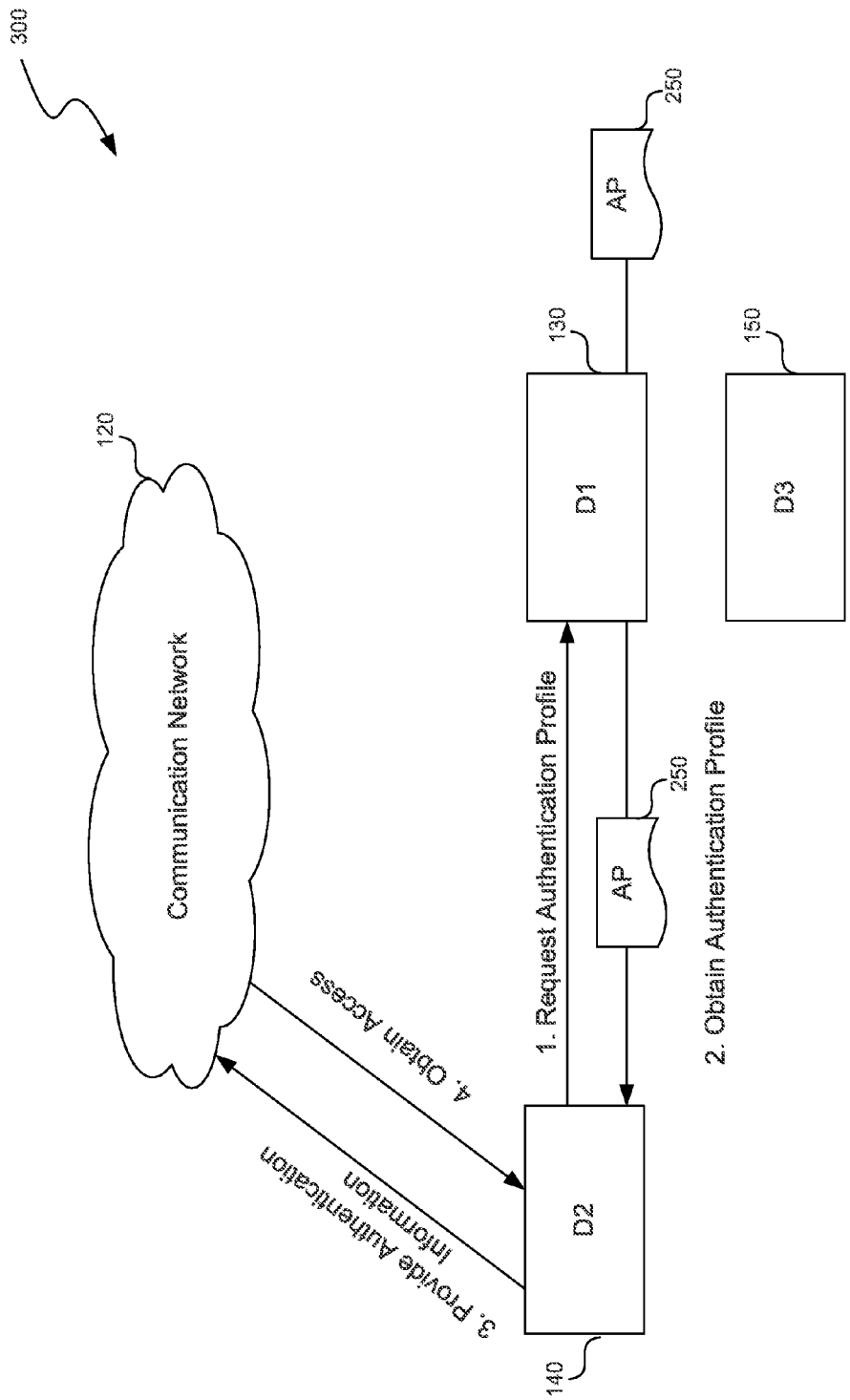
FIG. 3 is an example illustrating sharing of the authentication profile between a group of computing devices.

FIG. 3 is an example 300 illustrating sharing of the authentication profile between a group of computing devices. In some embodiments, the example 300 may be implemented in the environment 100. The user intends to access the communication network 120 using the second computing device 140. The communication network 120 requests the user to provide authentication information, e.g., password. The user can provide the authentication information manually, e.g., type in the password, or obtain the password from another computing device, e.g., a computing device that has accessed the communication network 120 previously. The second computing device 140 determines if any other computing devices, e.g., computing devices 130 and 150 contain the authentication information. The second computing device 140 determines that the first computing device contains the authentication profile 250 for the communication network 120.

The second computing device 140 requests the first computing device 130 to share the authentication profile 250 with the second computing device 140. The first computing device 130 then transmits the authentication profile 250 to the second computing device 140. In some embodiments, the first computing device 130 can encrypt the authentication profile 250 and then transmit the encrypted authentication profile 250. The second computing device 140 obtains the authentication profile 250, decrypts the authentication profile 250 if encrypted, and extracts the authentication information, e.g., password to the wireless network, from the authentication profile 250. The second computing device 140 then provides the authentication information to the communication network 120 and obtains access to the communication network 120 upon successful authentication. In some embodiments, by obtaining the authentication profile 250 from the first computing device 130, the need for a manual user input of the password to the wireless network is eliminated.

Figure 4:
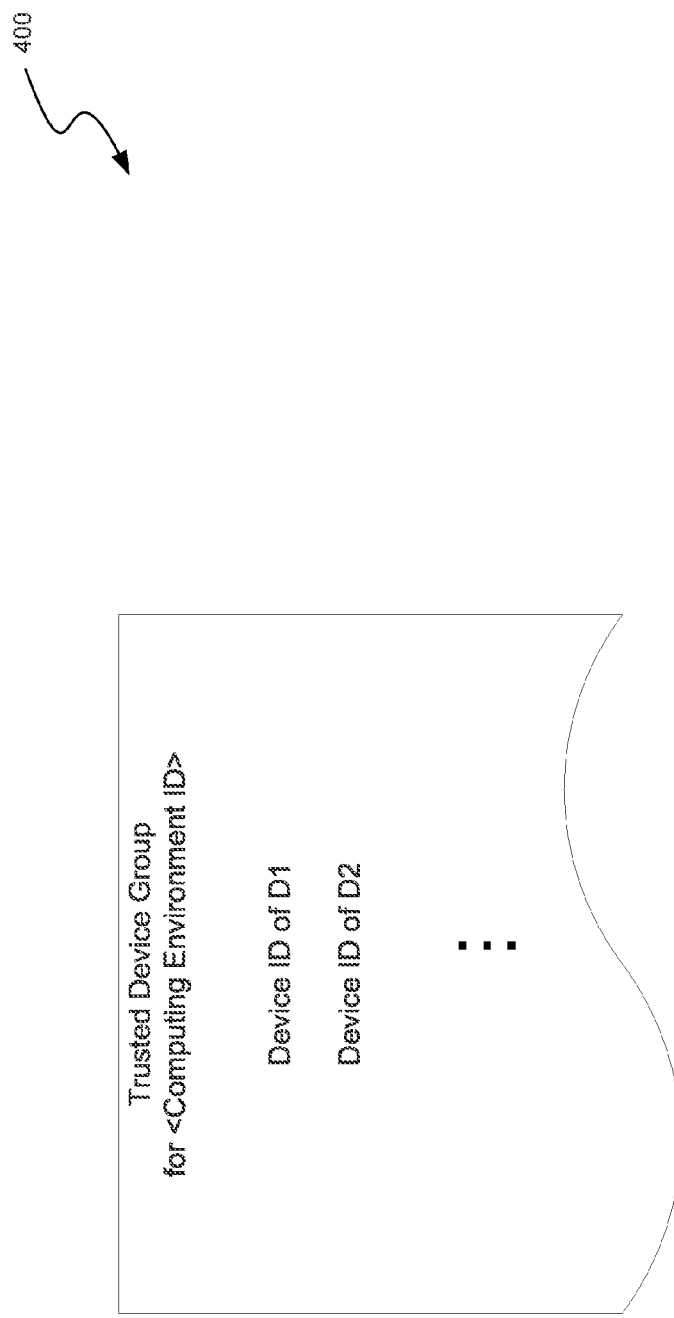
FIG. 4 is an example of a trusted devices group table containing a set of computing devices of a trusted devices group for a particular computing environment.

In some embodiments, the first computing device 130 shares the authentication profile 250 with the second computing device 140 if the second computing device 140 is a member of the trusted devices group of which the first computing device 130 is a member. A trusted devices group is a set of computing devices between which an authentication profile for a particular computing environment can be shared. FIG. 4 is an example of a trusted devices group table 400 containing the set of computing devices of a trusted devices group for a particular computing environment. The trusted devices group table 400 contains device IDs of the computing devices that are part of the trusted devices group and a computing environment ID of the particular computing environment. In some embodiments, the device IDs can be user defined device IDs, media access control (MAC) address of the computing devices 130-150, or other IDs that can identify the computing devices 130-150 uniquely. Each of the computing devices 130-150 can have a copy of the trusted devices group table 400, have access to a location where the trusted devices group table 400 is stored, or have a means to determine whether or not the computing devices are members of a particular trusted devices group.

In some embodiments, the computing devices 130-150 can provide a graphical user interface (GUI) to manage the trusted devices group. The user can customize the trusted devices group, e.g., add or remove computing devices from a group, add or remove a trusted device group, using the GUI. The trusted devices group table 400 is one implementation of the trusted devices group. However, the trusted devices group can be implemented using various data structures. For example, the trusted devices group can be implemented as a software object. In another example, the trusted devices group can be implemented as a file.

Further, in some embodiments, the first computing device 130 shares the authentication profile 250 with the second computing device 140 based on the location of the first computing device 130. For example, if the communication network 120 is a wireless network, the first computing device 130 can share the authentication profile 250 with the second computing device 140 if the first computing device 130 is also connected to the wireless network. In another example, the first computing device 130 can share the authentication profile 250 if the first computing device 130 is in proximity to the second computing device 140, e.g., to facilitate the computing devices 130 and 140 communicate with each other using various direct communication techniques. A direct communication technique can include Wi-Fi communication via a wireless access point and peer-to-peer (P2P) communication techniques, e.g., Bluetooth, Wi-Fi direct, AirDrop, Infrared, DLNA, or NFC.

The computing devices 130-150 communicate with each other using the above described direct communication techniques or via a server. For example, the second computing device 140 can request the other computing devices, e.g., computing devices 130 and 150, for the authentication profile 250 using the direct communication technique. Similarly, the first computing device 130 can respond and/or transmit the authentication profile 250 to the second computing device 140 using a direct communication technique. In another example, the computing devices 130-150 can share the authentication profile 250 via the server.

Figure 5:
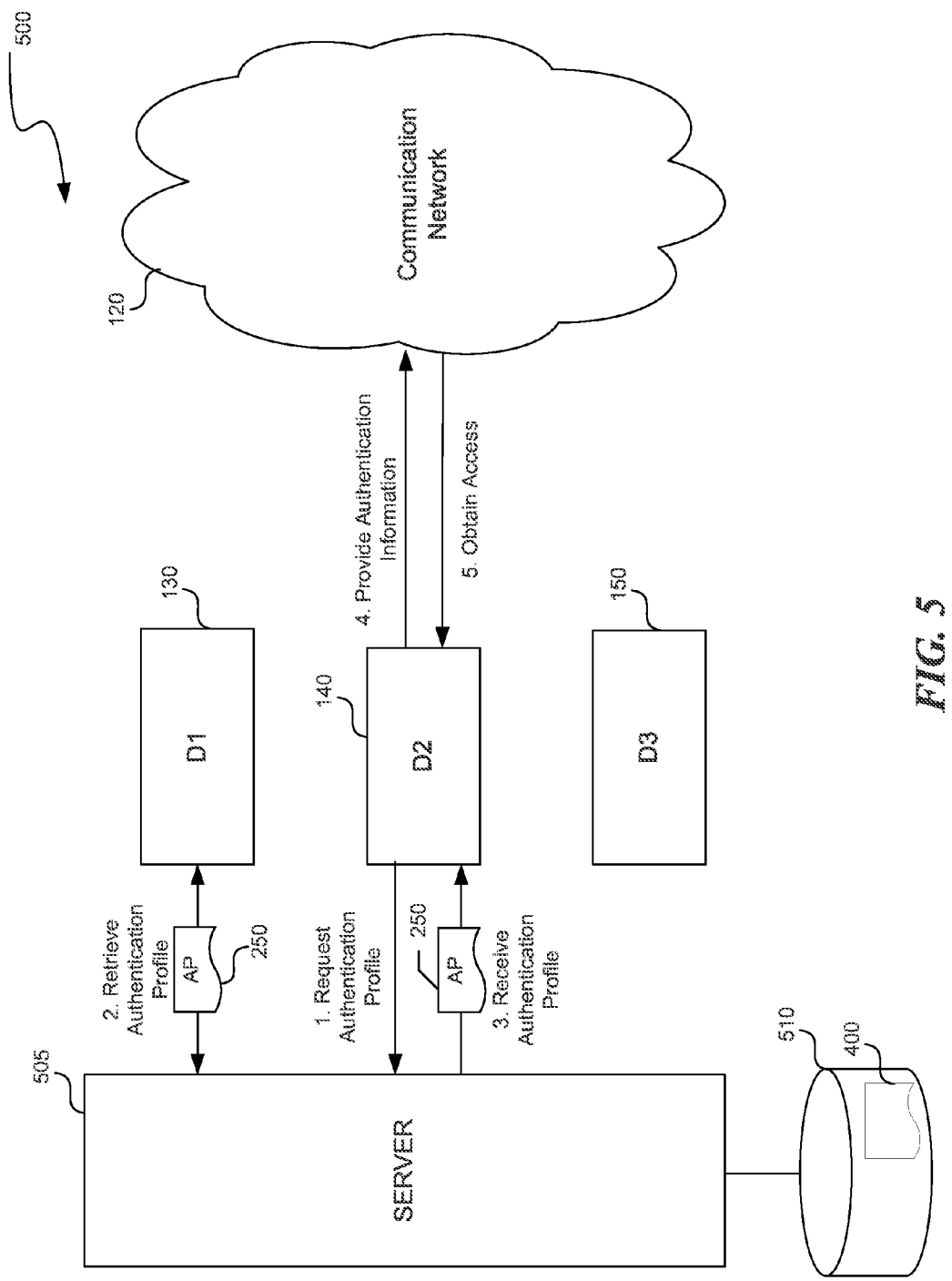
FIG. 5 is a block diagram illustrating a system for sharing the authentication profile between computing devices of a group via a server.

FIG. 5 is a block diagram illustrating a system 500 for sharing authentication profile between computing devices of a group via a server. In some embodiments, the system 500 can be implemented in the environment 100. The user intends to access the communication network 120 using the second computing device 140. The communication network 120 requests the user to provide authentication information, e.g., password. The user can provide the authentication information manually, e.g., type in the password, or obtain the password from another computing device, e.g., a computing device that has accessed the communication network 120 previously or a computing device that contains the authentication profile 250. The second computing device 140 requests a server 505 to obtain the authentication information for accessing the communication network 120. In some embodiments, the second computing device 140 communicates server 505 via a network (different from communication network 120) such as LAN, wireless LAN or Internet. It is assumed that the computing devices 130-150 have access to the server 505.

The server 505 determines if any of the other computing devices, e.g., computing devices 130 and 150 contain the authentication information. The server 505 can find the computing devices having the authentication profile in various ways. For example, the server 505 can send a request to each of the computing devices to determine if the computing devices contain the authentication information for the communication network 120. In another example, the server 505 can maintain, for each of the computing devices, a list of computing environments 105 a particular computing device has the authentication profile 250 for. The server 505 can determine from the list whether a particular computing device has an authentication profile for a particular computing environment. The computing devices 130-150 can report to the server 505 whenever they access a new computing environment and the server 505 can update the list accordingly. The server 505 can maintain the list at a data store 510. In some embodiments, the server 505 can also store the authentication profiles generated by the computing devices at the data store 510. In some embodiments, a user such as an administrator of the server 505 or the user of computing devices 130-150 can decide whether to store the authentication profiles, e.g., authentication profile 250, in the data store 510.

Referring back to the determination by the server 505, the server 505 determines that the first computing device 130 contains the authentication profile 250 for the communication network 120. The server 505 determines whether the first computing device 130 and the second computing device 140 are members of the same trusted devices group for the communication network 120. In some embodiments, the server 505 stores the information regarding the trusted devices groups, e.g., trusted devices group table 400, in the data store 510. If the server 505 determines that the first computing device 130 and the second computing device 140 are members of the same trusted devices group, the server 505 obtains the authentication profile 250 from the first computing device 130. Alternatively, the server 505 can obtain the authentication profile 250 from the data store 510, if the server 505 is configured to store the authentication profile 250 at the data store 510.

The server 505 transmits the authentication profile 250 to the second computing device 140. In some embodiments, the server 505 can encrypt the authentication profile 250 and then transmit the encrypted authentication profile 250. The second computing device 140 receives the authentication profile 250 from the server 505, decrypts the authentication profile 250 if encrypted, and extracts the authentication information, e.g., password to the wireless network, from the authentication profile 250. The second computing device 140 then provides the authentication information to the communication network 120 and obtains access to the communication network 120 upon successful authentication.

Figure 6:
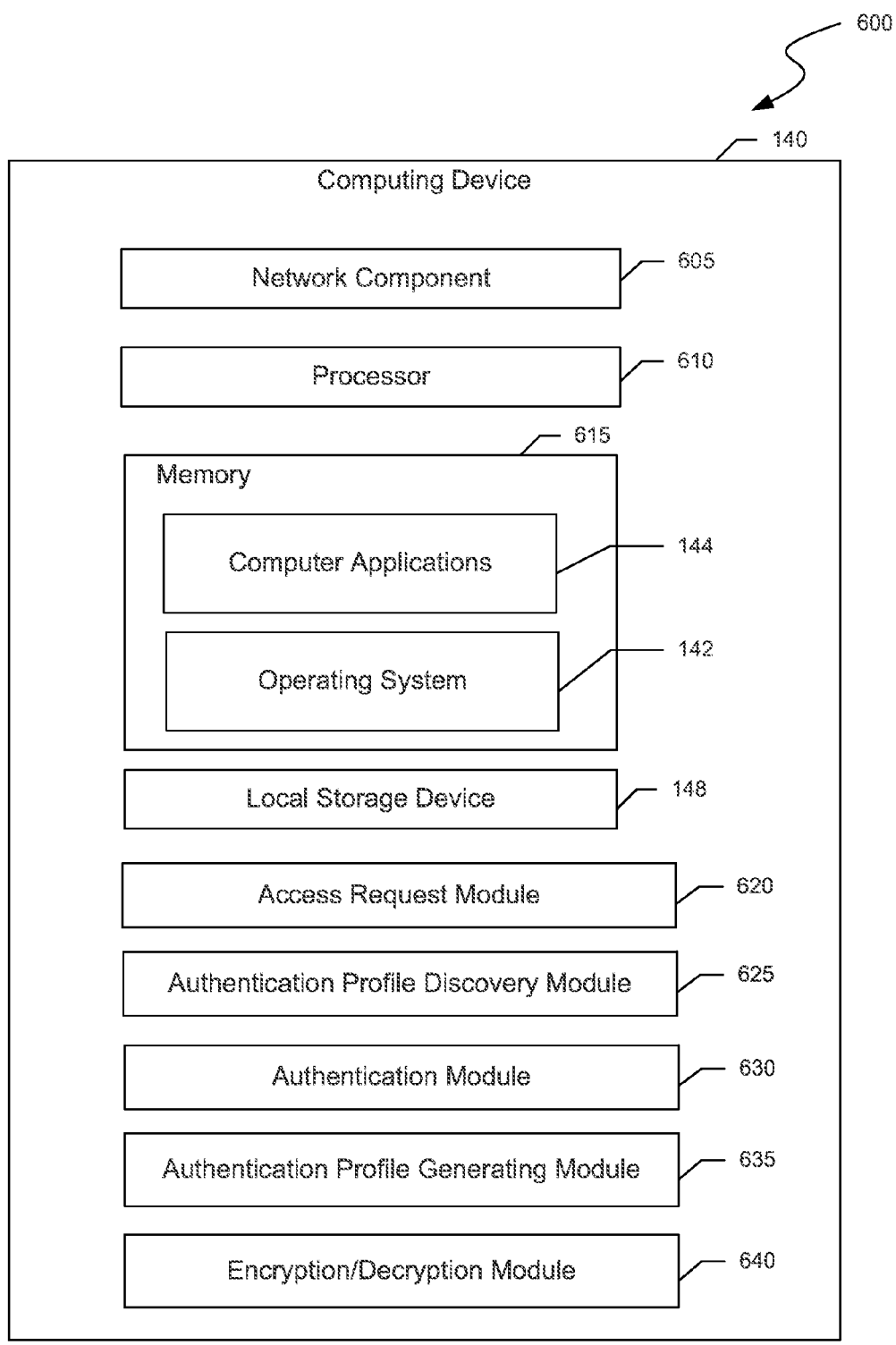
FIG. 6 is a block diagram of the computing device that can be used for accessing the access restricted computing environment and sharing the authentication profiles.

FIG. 6 illustrates a block diagram 600 of a computing device that can be used for accessing the access restricted computing environment 105 and sharing the authentication profiles. The computing device 140 can include a network component 605, a processor 610, a memory 615, the local storage device 148, an access request module 620, an authentication profile discovery module 625, an authentication module 630, an authentication profile generating module 635, and an encryption/decryption module 640. The memory 615 can store instructions of the operating system 142 of the computing device 140. The memory 615 can further store instructions of the computer applications 144 designed to run at the computing device 140.

The network component 605 can be capable of switching between states including a high power consumption state and a low power conservation state. The network component 605 can be, e.g. a Wi-Fi networking adapter, a cellular phone networking adapter, etc. The network component 605 is configured for network communications with other devices, including the server 505 and other computing devices, e.g., the computing devices 140 and 150, e.g., for sharing authentication profiles. The processor 610 is configured to execute the computer applications 144 and the operating system 142 of the computing device 140. The memory 615 stores instructions of the operating system 142 which, when executed by the processor 610, cause the operating system 142 to perform processes for realizing certain functionalities of the computing device 140. For instance, the process of the operating system 142 can facilitate the other modules of the computing device 140 to communicate with the server 505 and other computing devices 130 and 150 to share the authentication profile 250.

The local storage device 148, as described above, can store the instructions, the operating system 142, user data such as profile data of the user, data files of the user and any other data necessary for the operation of the computing device 140 and execution of the computer applications 144.

The access request module 620 requests a computing environment 105, e.g., communication network 120 access to the computing environment 105. The authentication profile discovery module 625 determines whether any of the computing devices, e.g., the first computing device 130 or the third computing device 150, has the authentication profile 250. The authentication profile discovery module 625 determines that the first computing device 130 has the authentication profile 250 of the user for the communication network 120 and obtains the authentication profile 250 from the first computing device 130. In some embodiments, the authentication profile discovery module 625 determines whether any of the computing devices has the authentication profile 250 by either requesting the other computing devices directly, e.g., using above described direct communication techniques, or requesting a server, e.g., server 505. Similarly, the other computing devices, e.g., the first computing device 130, can respond to the request and/or transmit the authentication profile 250 to the second computing device 140 directly or via the server 505.

In some embodiments, the first computing device 130 shares the authentication profile 250 with the second computing device 140 if the second computing device 140 is a member of the trusted devices group of which the first computing device 130 is a member. The first computing device 130 determines, e.g., using an authentication profile discovery module such as the authentication profile discovery module 625, whether the first computing device 130 and the second computing device 140 are members of the same trusted devices group for the communication network 120.

In some embodiments, the first computing device 130 can encrypt the authentication profile 250, e.g., using an encryption module such as the encryption/decryption module 640, and then transmit it to the second computing device 140. After receiving the encrypted authentication profile 250 from the first computing device 130, the encryption/decryption module 640 decrypts the encrypted authentication profile 250. The authentication module 630 extracts the authentication information, e.g., password to the communication network 120, from the authentication profile 250, and provides the authentication information to the communication network 120. Upon successful authentication of the password, the second computing device 140 obtains access to the communication network 120. The second computing device 140 may then communicate with other computer systems over the communication network 120, e.g., via the network component 605.

The authentication profile generating module 635 generates an authentication profile such as the authentication profile 250, e.g., when the user of the second computing device 140 accesses a computing environment 105 and no other computing device of the user has the authentication profile 250 for the computing environment 105.

Note that in some embodiments, the computing devices 140 and 150 also include components/modules described above with reference to computing device 130.

Figure 7:
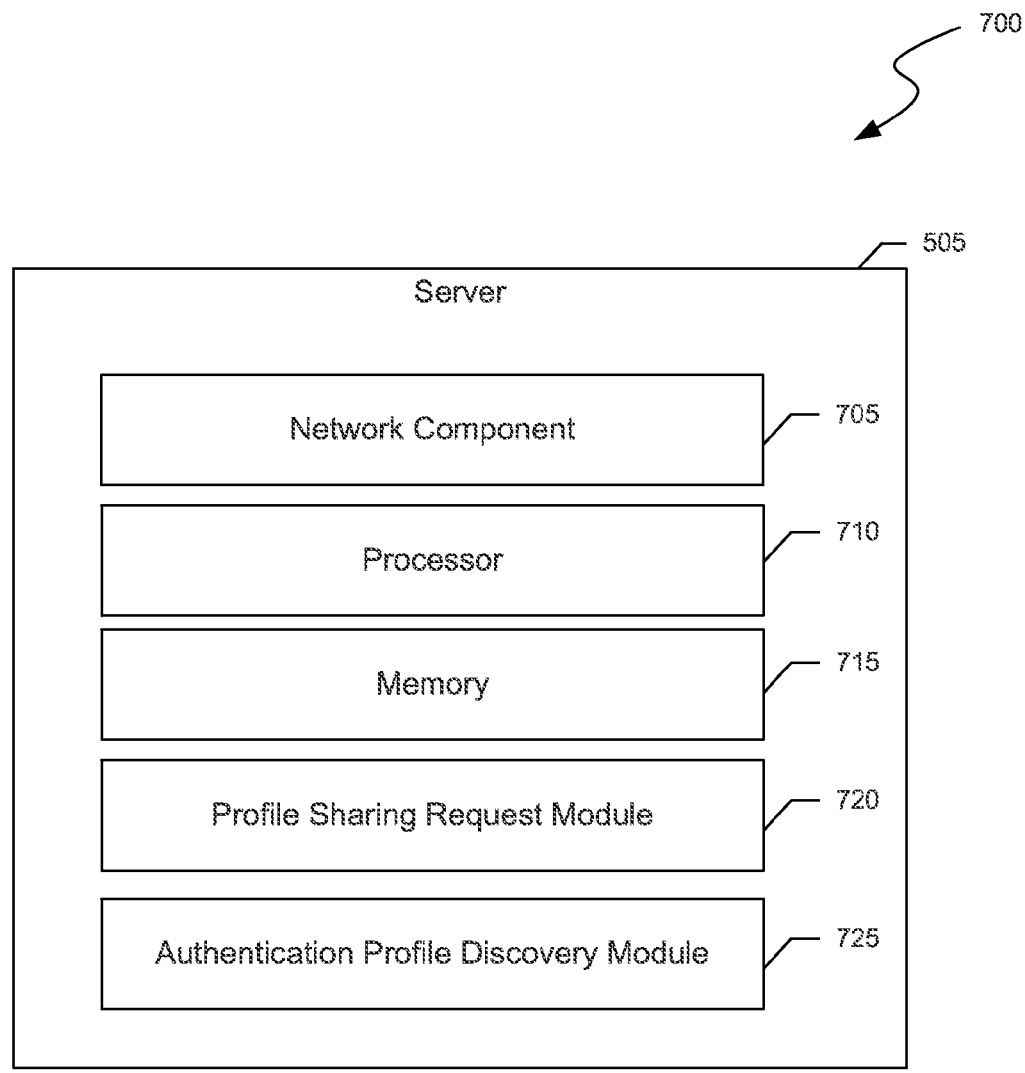
FIG. 7 is a block diagram of a server for facilitating sharing of authentication profiles between computing devices of a group.

FIG. 7 is a block diagram of a server for facilitating sharing of authentication profiles between computing devices of a group. The server 505 can be, e.g., a dedicated standalone server, or implemented in a cloud computing service having a plurality of servers. The server 505 includes a network component 705, a processor 710, a memory 715, a profile sharing request module 720 and an authentication profile discovery module 725. The memory 715 can include instructions which when executed by the processor 710 enables the server 110 to perform the functions, including sharing authentication profile between the computing devices 130 and 140, as described with reference to FIG. 5. The network component 705 is configured for network communications with other devices, including the computing devices 130, 140 and 150, e.g., for sharing authentication profile 250 between the computing devices 130 and 140.

The profile sharing request module 720 receives a request from a computing device of a user, e.g., a second computing device 140 to provide the authentication profile for accessing an access restricted computing environment 105, e.g., communication network 120. The authentication profile discovery module 725 to determines if any of the computing devices, e.g., computing devices 130 and 150, contain the authentication profile 250 for accessing the communication network 120. In some embodiments, a particular computing device on which the user has been authenticated by the communication network 120 previously can have the authentication profile 250.

The authentication profile discovery module 725 can find the computing devices having the authentication profile in various ways. For example, the authentication profile discovery module 725 can send a request to each of the computing devices, e.g., computing device 130 and 150, to determine if the computing devices contain the authentication information for the communication network 120. In another example, the server 505 can maintain, for each of the computing devices, a list of computing environments 105 a particular computing device has the authentication profile for. The authentication profile discovery module 725 can determine from the list whether a particular computing device has an authentication profile for a particular computing environment.

After the authentication profile discovery module 725 determines that a computing device, e.g., the first computing device 130 contains the authentication profile 250 for the communication network 120, the authentication profile discovery module 725 can obtain the authentication profile 250 from the first computing device 130. In some embodiments, the authentication profile discovery module 725 obtains the authentication profile 250 from the first computing device 130 if the first computing device 130 and the second computing device 140 are members of the same trusted devices group for the communication network 120. In some embodiments, the authentication profile discovery module 725 can refer to the trusted devices group table 400 to determine whether the first computing device 130 and the second computing device 140 are members of the same trusted devices group for the communication network 120.

After obtaining the authentication profile 250 from the first computing device 130, the network component 705 transmits the authentication profile 250 to the second computing device 140. In some embodiments, the authentication profile discovery module 725 receives the authentication profile 250 from the first computing device 130 in an encrypted format and transmits the authentication profile 250 to the second computing device 140 in an encrypted format. In some embodiments, the authentication profile discovery module 725 communicates with the other components, e.g., computing devices 130-150 and data store 510 over one or more communication networks (different from communication network 120) such as LAN, WAN, or Internet.

Figure 8:
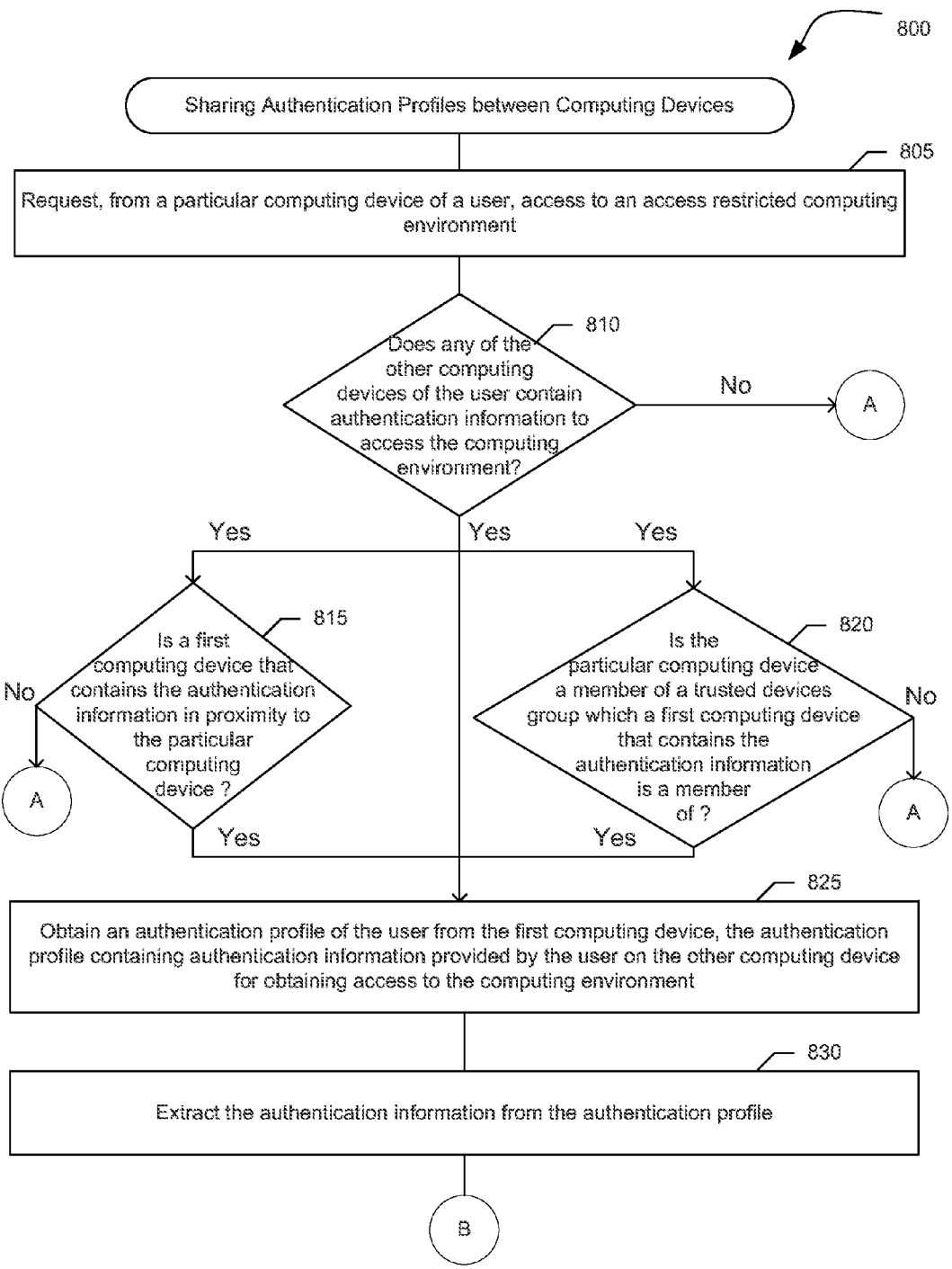
FIG. 8 is a flow diagram a process of sharing authentication profiles between computing devices of a group for access a particular access restricted computing environment.
Figure 8:
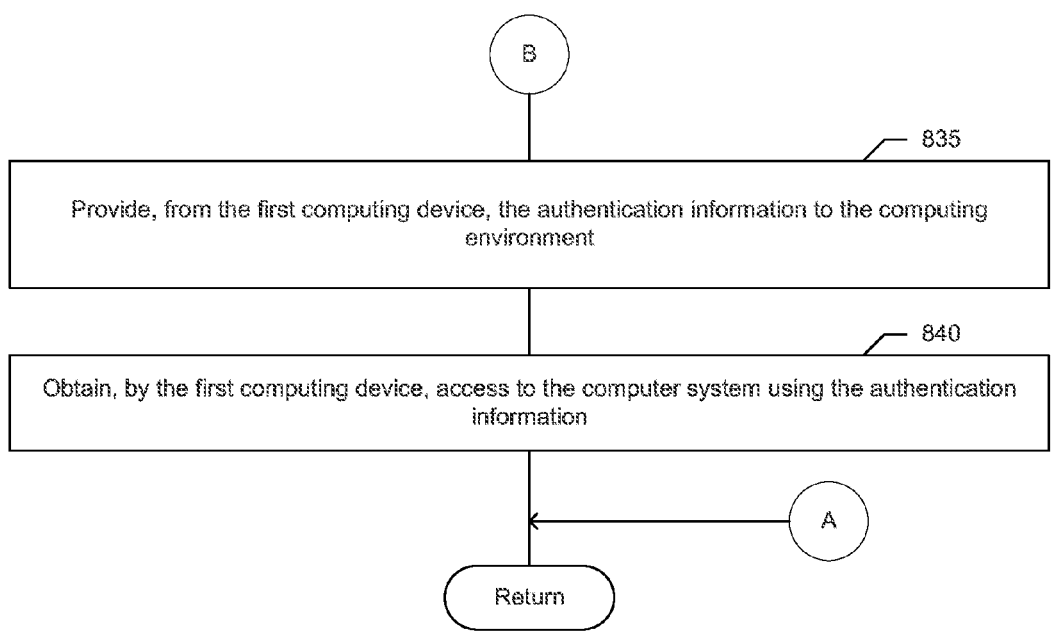

FIG. 8 is a flow diagram a process 800 of sharing authentication profiles between computing devices of a group for access a particular access restricted computing environment. In some embodiments, the process 800 may be implemented in the environment 100 of FIG. 1, and may be executed using a computing device such as computing device 140. At block 805, the access request module 620 requests access to an access restricted computing environment, e.g., communication network 120.

At decision block 810, the authentication profile discovery module 625 determines whether any of the other computing devices, e.g., computing devices 130 and 150 contain the authentication information to access the computing environment 105. Responsive to a determination that none of the other computing devices contain the authentication profile for accessing the computing environment 105, the process 800 returns. Alternatively, the user can provide the authentication information, e.g., by inputting the authentication information manually.

After the determination that one of the computing devices of the user, e.g., a first computing device 130, contains the authentication profile, the process 800 can proceed in multiple possible paths, e.g., a first path—block 810 to 825, a second path—810 to 815, or a third path 810 to 820.

In the first path, the process 800 proceeds to block 825 to obtain the authentication profile from the first computing device 130.

In the second path, the process 800 can proceed to decision block 815 to determine if the second computing device 140 and the first computing device 130 are in proximity. The first computing device 130 can share the authentication profile 250 if the first computing device 130 is in proximity to the second computing device 140. In some embodiments, the computing devices are considered to be in proximity if they can communicate with each other using above described direct communication techniques. The first computing device 130 shares the authentication profile 250 with the second computing device 140 based on the location of the first computing device 130. In some embodiments, the first computing device 130 is considered to be in proximity with the second computing device 140 if the first computing device 130 is also connected to the communication network 120. If the first computing device 130 is in proximity to the second computing device 140, the process 800 process proceeds to block 825, else the process 800 returns.

In the third path, the process 800 proceeds to decision block 820. At decision block 820, the authentication profile discovery module 625 determines if the first computing device 130 and the second computing device 140 are members of the same trusted devices group for the computing environment 105. Responsive to a determination that the first computing device 130 and the second computing device 140 are members of the same trusted devices group for the communication network 120, the process 800 process proceeds to block 825, else the process 800 returns.

At block 825, the authentication profile discovery module 625 obtains the authentication profile for the computing environment 105 from the first computing device 130. At block 830, the authentication module 630 extracts the authentication information from the authentication profile, and at block 835, the authentication module 630 provides the authentication information to the computing environment 105. Upon successful authentication by the computing environment 105, at block 840, the second computing device 140 obtains access to the computing environment 105, and the process 800 returns.

Note that the path taken by the process 800 from the decision block 810 to block 825 can be customized by the user. In some embodiments, the user can also configure additional paths, e.g., the process 800 can perform both the checks 815 and 820, and obtain the authentication profile 250 if both the checks are satisfied (e.g., they result in a "yes").

The computing devices 130-150 can communicate with one another, e.g., to perform the steps of 810-825, directly or via a server. For example, the computing devices 130-150 can communicate with one another directly using direct communication techniques as described at least with reference to FIG. 3. In another example, the computing devices 130-150 can communicate with one another via a server as described at least with reference to FIG. 5.

FIG. 9 is a block diagram of a computer system as may be used to implement features of some embodiments of the disclosed technology. The computing system 900 may be used to implement any of the entities, components or services depicted in the examples of FIGS. 1-8 (and any other components described in this specification). The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 910 can be implemented as software and/or firmware to program the processor(s) 905 to carry out actions described above. In some embodiments, such software or firmware may be initially provided to the computing system 900 by downloading it from a remote system through the computing system 900 (e.g., via network adapter 930).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method comprising:
   requesting, from a first computing device of a user, an access to a computer system, the computer system configured to provide access to the computer system to authenticated users;
   determining, by the first computing device, whether the computer system has authenticated the user on any of multiple computing devices of the user previously;
   responsive to a determination that the computer system has authenticated the user on a second computing device of the computing devices, obtaining, by the first computing device and from the second computing device, an authentication profile of the user, the authentication profile used to provide the user access to the computer system from the second computing device; and
   accessing, by the first computing device, the computer system using the authentication profile obtained from the second computing device,
   wherein obtaining the authentication profile from the second computing device includes determination by the second computing device whether the first computing device is member of a trusted devices group the second computing device is a member of, the trusted devices group including a set of the computing devices which can share the authentication profile between each other for accessing the computer system,
   wherein determining whether the first computing device belongs to a trusted devices group the second computing device is part of includes verifying, by the second computing device and with a server computer having the trusted devices group, the membership of the first computing device using a device identification information of the first computing device,
   wherein the server sends out request to each of the members of the trusted devices group for information regarding an authorization of the requested member to access the wireless network, the server utilizing the requested information to determine whether any of the members of the trusted devices group is authorized to access the computer system,
   wherein the server obtains the authentication profile from the second computing device responsive to the determination that the second computing device of the trusted devices group is authorized to access the computing system, the server transmitting the obtained authentication profile to the first computing device.

2. The computer-implemented method of claim 1, wherein the second computing device obtains, for the user, access to the computer system upon successful authentication of the user by the computer system.

3. The computer-implemented method of claim 2 further comprising:
   generating, by the second computing device, the authentication profile for the user on the second computing device, the authentication profile including authentication information provided by the user to the computer system to authenticate the user.

4. The computer-implemented method of claim 2, wherein the authentication information includes at least one of a user name, a password, a passcode, or an answer to a challenge question posted by the computer system.

5. The computer-implemented method of claim 2, wherein authenticating the user includes authenticating the user or the second computing device.

6. The computer-implemented method of claim 2, wherein obtaining access to the computer system from the second computing device includes:
   requesting, by the user and using the second computing device, access to the computer system,
   receiving an authentication prompt from the computer system,
   inputting, by the user and in response to an authentication prompt from the computer system, authentication information, and
   obtaining, by the user, access to the computer system from the second computing device upon successful authentication of the user based on the authentication information.

7. The computer-implemented method of claim 1, wherein the authentication profile includes authentication information provided by the user for authentication by the computer system to obtain access to the computer system.

8. The computer-implemented method of claim 7, wherein accessing the computer system from the first computing device using the authentication profiles includes:
   extracting, by the first computing device, the authentication information from the authentication profile,
   providing, by the first computing device, the authentication information to the computer system, and
   receiving, by the first computing device, access to the computer system.

9. The computer-implemented method of claim 1, wherein the server computer contains multiple trusted devices groups of the computing devices for the user for accessing multiple computer systems, each of the trusted devices groups containing member computing devices that can share the authentication profile for accessing a particular computer system of the computer systems.

10. The computer-implemented method of claim 1, wherein obtaining the authentication profile from the second computing device includes:
    determining, by the second computing device, whether the first computing device is in proximity to the second computing device, and
    responsive to the determination that the first computing device is in proximity to the second computing device, transmitting, by the second computing device, the authentication profile to the first computing device.

11. The computer-implemented method of claim 10, wherein determining whether the first computing device is in proximity to the second computing device includes determining whether the first computing device and the second computing device can communicate with each other using a direct communication technique, the direct communication technique including at least one of (a) Bluetooth, (b) WiFi direct, (c) WiFi, (d) near field communication (NFC), (e) AirDrop, (f) Infrared, or (g) digital living network alliance (DLNA).

12. The computer-implemented method of claim 1, wherein the computer system includes at least one of a server computer, an application executing on the server computer, or a communication network.

13. The computer-implemented method of claim 12, wherein the communication network includes a wireless network.

14. The computer-implemented method of claim 1, wherein obtaining the authentication profile from the second computing device includes:
    encrypting, by the second computing device, the authentication profile to generate an encrypted authentication profile, and
    transmitting the encrypted authentication profile to the first computing device.

15. The computer-implemented method of claim 1, wherein obtaining the authentication profile from the second computing device includes obtaining the authentication profile directly from the second computing device using at least one of (a) Bluetooth, (b) WiFi direct, (c) WiFi, (d) NFC, (e) AirDrop, (f) Infrared, or (g) DLNA.

16. A computer-implemented method comprising:
    requesting, from a first computing device of a user, an access to a wireless network;
    receiving, by the first computing device, an authentication prompt from the wireless network to provide authentication information to gain access to the wireless network;
    obtaining, by the first computing device and from a second computing device of the user, an authentication profile of the user, the authentication profile containing authentication information provided by the user to gain access to the wireless network; and
    accessing, using the first computing device, the wireless network using the authentication profile obtained from the second computing device,
    wherein obtaining the authentication profile from the second computing device includes requesting, by the first computing device, a server to obtain the authentication profile, the server containing a trusted devices group having a set of computing devices of the user as members of the trusted devices group, wherein the members share the authentication profile between each other to access the wireless network,
    wherein the server sends out request to each of the members of the trusted devices group for information regarding an authorization of the requested member to access the wireless network, the server utilizing the requested information to determine whether any of the members of the trusted devices group is authorized by the wireless network to access the wireless network,
    wherein the server obtains the authentication profile from the second computing device responsive to the determination that the second computing device of the trusted devices group is authorized to access the wireless network, the server transmitting the obtained authentication profile to the first computing device.

17. The computer-implemented method of claim 16, wherein the authentication information includes at least one of a user name or password to access the wireless network.

18. The computer-implemented method of claim 16, wherein obtaining the authentication profile from the second computing device includes:
    encrypting, by the second computing device, the authentication profile to generate an encrypted authentication profile, and
    transmitting, by the second computing device, the encrypted authentication profile to the first computing device.

19. The computer-implemented method of claim 16, wherein obtaining the authentication profile from the second computing device includes obtaining the authentication profile directly from the second computing device using at least one of (a) Bluetooth, (b) WiFi direct, (c) WiFi, (d) NFC, (e) AirDrop, (f) Infrared, or (g) DLNA.

20. The computer-implemented method of claim 16, wherein obtaining the authentication profile generated at the second computing device includes verifying, by the server, whether the first computing device is a member of the trusted devices group.

21. A computing device for obtaining access to a wireless network, comprising:
   a processor;
   an access request module to request access to a wireless network;
   an authentication profile discovery module to obtain an authentication profile of the user for the wireless network from a second computing device of the user, the authentication profile containing authentication information provided by the user to gain access to the wireless network;
   an authentication module to provide the authentication information to the wireless network; and
   a network component to communicate with a computer system over the wireless network after obtaining access to the wireless network using the authentication information,
   wherein the authentication profile discovery module is configured to obtain the authentication profile from a server, the server containing a trusted devices group having a set of computing devices of the user as members of the trusted devices group, wherein the members share the authentication profile between each other to access the wireless network,
   wherein the server is configured to send out a request to each of the members of the trusted devices group for information regarding an authorization of the requested member to access the wireless network, the server utilizing the requested information to determine whether any of the members of the trusted devices group is authorized by the wireless network to access the wireless network,
   wherein the server is configured to verify if the computing device is a member of the trusted devices group, and wherein the server is configured to obtain the authentication profile from the second computing device responsive to the determination that the second computing device of the trusted devices group is authorized to access the wireless network.

22. The computing device of claim 21 further comprising:
   a decryption module to decrypt the authentication profile received from the second computing device.

23. The computing device of claim 21 further comprising:
   an encryption module to encrypt a first authentication profile generated by the computing device, the first authentication profile containing authentication information provided by the user, using the computing device, to access the wireless network.

24. The computing device of claim 21, wherein the authentication profile discovery module is configured to obtain the authentication profile from the second computing device using at least one of (a) Bluetooth, (b) WiFi direct, (c) WiFi, (d) NFC, (e) AirDrop, (f) Infrared, or (g) DLNA.

25. A computing device for obtaining access to a wireless network, comprising:
   a processor;
   an access request module to request access to a computer system, the computer system configured to provide access to the system to authenticated users;
   an authentication profile discovery module to find one or more multiple computing devices of the user on which the computer system has authenticated the user previously, and
   obtain an authentication profile of the user from a second computing device of the one or more computing devices on which the user is authenticated to access the computer system, the authentication profile containing authentication information provided by the user to gain access to the computer system; and
   an authentication module to provide the authentication information to the computer system to gain access to the computer system,
   wherein the authentication profile discovery module is configured to obtain the authentication profile stored at the second computing device from a server, the server containing a trusted devices group having a set of computing devices of the user as members of the trusted devices group, the server configured to restrict a sharing of the authentication profile between the members,
   wherein the server is configured to send out a request to each of the members of the trusted devices group for information regarding an authorization of the requested member to access the wireless network, the server utilizing the requested information to determine whether any of the members of the trusted devices group is authorized by the wireless network to access the wireless network,
   wherein the server is configured to verify if the computing device is a member of the trusted devices group, and share the authentication profile generated at the second computing device with the computing device if the computing device is a member of the trusted devices group to which the second computing device belongs.

26. The computing device of claim 25 further comprising:
   a storage device to store the authentication profile received from the second computing device.

27. The computing device of claim 25 further comprising:
   a decryption module to decrypt the authentication profile received from the second computing device.

28. The computing device of claim 25 further comprising:
   an encryption module to encrypt a first authentication profile generated by the computing device, the first authentication profile containing authentication information provided by the user, using the computing device, to access the computer system.

29. The computing device of claim 25, wherein the authentication profile discovery module is configured to obtain the authentication profile from the second computing device using at least one of (a) Bluetooth, (b) WiFi direct, (c) WiFi, (d) NFC, (e) AirDrop, (f) Infrared, or (g) DLNA.

30. The computing device of claim 25, wherein the server is configured to verify if the computing device is a member of the trusted devices group using a device identification of the computing device.

31. A server for facilitating sharing of an authentication profile between multiple computing devices to access computing environment, comprising:
   a processor;
   a profile sharing request module to receive a request from a first computing device of the computing devices of the user to provide the authentication profile for accessing the computing environment;
   an authentication profile discovery module to
   find one or more of the computing devices of the user on which the computing environment has authenticated the user previously, and
   obtain the authentication profile of the user from a second computing device of the computing devices on which the user is authenticated to access the computing environment, the authentication profile containing authentication information provided by the user to gain access to the computing environment; and a network component to provide the authentication profile obtained from the second computing system to the first computing system, wherein the authentication profile discovery module is configured to:

verify if the first computing device is a member of a trusted devices group of which the second computing device is a member, the authentication profile discovery module configured to restrict a sharing of the authentication profile between a set of computing devices of the user that are members of the trusted devices group, send out a request to each of the members of the trusted devices group for information regarding an authorization of the requested member to access the wireless network, wherein the requested information is utilized to determine whether any of the members of the trusted devices group is authorized by the wireless network to access the wireless network, and share the authentication profile generated at the second computing device with the first computing device upon verifying that the first computing device is a member of the trusted devices group to which the second computing device belongs.

32. The server of claim 31 further comprising:

a storage device to store the authentication profile received from the second computing device.

33. The computing device of claim 31, wherein the server is configured to verify if the first computing device is a member of the trusted devices group using a device identification of the first computing device.

* * * * *